United States Patent
Sakamoto (10) Patent No.: US 7,158,467 B2
(45) Date of Patent: Jan. 2, 2007

(54) OPTICAL PICK-UP APPARATUS AND OBJECTIVE LENS FOR THE OPTICAL PICK-UP APPARATUS

(75) Inventor: Katsuya Sakamoto, Hachioji (JP)

(73) Assignee: Konica Corporation, Tokyo (JP)

( * ) Notice: Subject to any disclaimer, the term of this patent is extended or adjusted under 35 U.S.C. 154(b) by 461 days.

(21) Appl. No.: 10/400,655

(22) Filed: Mar. 28, 2003

(65) Prior Publication Data

US 2003/0189886 A1    Oct. 9, 2003

(30) Foreign Application Priority Data

Apr. 3, 2002  (JP) .............................. 2002-101049

(51) Int. Cl.
  *G11B 7/00* (2006.01)
(52) U.S. Cl. ............................ 369/112.01; 369/112.08; 369/103
(58) Field of Classification Search ........... 369/112.01, 369/112.08, 112.23, 112.03, 112.05, 112.26, 369/44.23, 44.24, 103
See application file for complete search history.

(56) References Cited

U.S. PATENT DOCUMENTS

| 6,515,955 B1 * | 2/2003 | Takeuchi | ............... | 369/112.08 |
| 6,594,222 B1 * | 7/2003 | Maruyama | ............. | 369/112.26 |
| 6,751,021 B1 * | 6/2004 | Hendriks et al. | ........... | 359/566 |

\* cited by examiner

*Primary Examiner*—Nabil Hindi
(74) *Attorney, Agent, or Firm*—Finnegan, Henderson, Farabow, Garrett & Dunner, L.L.P.

(57) ABSTRACT

An optical pick-up apparatus has a first light source, a second light source, and an optical system including an objective lens. An optical functional surface of the objective lens is divided into at least first and second concentric optical functional regions. The second functional region is provided with a diffractive structure to correct a spherical aberration of a converged light spot on an information recording plane to be regulated in a range where reproduction and/or recording information for a first optical information recording medium can be conducted when the refractive index of the optical element and the wavelength of the first light source vary due to a change of the working temperature of the optical system.

11 Claims, 3 Drawing Sheets

OPTICAL PICK-UP APPARATUS AND OBJECTIVE LENS FOR THE OPTICAL PICK-UP APPARATUS

BACKGROUND OF THE INVENTION

The present invention relates to an optical pick-up apparatus which performs at least either reproduction or recording of information on a plurality of types of optical information recording media having respective different thickness of protective substrates each other, and an objective lens for the optical pick-up apparatus.

With a short wavelength type red color semiconductor laser which has recently been put to practical use, commercialized has been a high density DVD (digital versatile disc) that is the same in size as a conventional CD (compact disc) but has a larger capacity as an optical information recording medium. When information is recorded on this DVD or reproduced from this DVD, it is necessary to utilize a short wavelength type red color semiconductor laser having a wavelength of 650 nm and an objective lens having a numerical aperture (NA) of approximately 0.6.

Further when information is recorded on CD or reproduced from CD, the semiconductor laser of wavelength of 780 nm is utilized, separately from the short wavelength semiconductor laser for DVDs, and the numerical aperture NA of the objective lens requires an approximate value of 0.45.

Further, required is an optical pick-up apparatus, featuring interchangeability of information recording media so as to perform recording and/or reproduction of information for both the CD and DVD on one apparatus. Information recording surfaces of these optical information recording media are protected by transparent base boards (or protective substrates), and the thicknesses of which are different from each other, depending on the specifications of each optical information recording medium, and have been determined to be 0.6 mm for DVD, and 1.2 mm for CD, respectively. In order to realize interchangeability between DVD and CD, each having a different thickness of transparent base boards, it is necessary to correct for spherical aberration caused by the thickness of the base boards, and thereby, an objective lens using diffractive light is proposed (See TOKKAI 2000-81566, for example).

The spherical aberration varies due to temperature change in the optical system of the optical pick-up apparatus. That is, a change in the refractive index of a plastic lens, such as generally used in the optical systems, is largely dependent on temperature change, and the spherical aberration varies based on the change of the refractive index. The emission wavelength of a laser source also varies depending on temperature, which causes a change of the spherical aberration. Influence on the recording and reproduction of information caused by the change of spherical aberration, quickly becomes excessive for DVDs which use short wavelength laser rays and an objective lens featuring a high numerical aperture. Proposed has been an objective lens having the nature to depend on the wavelength, in order to correct the spherical aberration caused by the change of refractive index of an objective lens due to changes of temperature (See TOKKAI 2001-249273).

However, TOKKAI 2001-249273 proposes only a countermeasure for the objective lens, and does not consider the whole optical system. Accordingly, in an optical pick-up apparatus having interchangeability between optical information recording media such as between CD and DVD, both of which are different types, it is necessary to devise a countermeasure for the change of spherical aberration, caused by temperature change in the whole optical system, employing the short wavelength laser rays and an objective lens with a high numerical aperture.

SUMMARY OF THE INVENTION

Based on the above-mentioned conventional technical drawbacks, in an optical pick-up apparatus which performs at least either recording or reproduction on a plurality of differing optical information recording media, the object of the present invention is to provide a pick-up apparatus and the objective lens for the pick-up apparatus in which spherical aberration caused by temperature change in the optical system, is corrected when either recording or reproduction is performed with short wavelength light flux.

To attain the above-mentioned object, an optical pick-up apparatus which can perform recording and/or reproduction for a plurality of optical information recording media incorporating protective substrates of different thickness, in such a way that for a first optical information recording medium whose thickness of the protective substrate is t1, the reproduction and/or recording of information is performed by a first light source having a wavelength of $\lambda 1$, and for a second optical information recording medium whose thickness of the protective substrate is t2 (t1<t2), the reproduction and/or recording of information is performed by a second light source having a wavelength of $\lambda 2$ ($\lambda 1 < \lambda 2$), is characterized by;

having an optical system in which the light rays from the first or second light source are brought to a focus on an information recording surface through optical elements including the objective lens, wherein, the optical functional surface of the objective lens is divided into at least two concentric optical functional regions centered on an optical axis, so that the light rays, passing through the first region including the optical axis, are used for recording and/or reproduction of information on both the first optical information recording medium and the second optical information recording medium, while the light rays, passing through the second region positioning around the first region, are used mainly for recording and/or reproduction of information on the first optical information recording medium, and wherein, a diffractive structure is arranged on the second region, to correct the spherical aberration of a converged light spot on the information recording surface to be in a range where reproduction and/or recording of the first optical information recording medium can be optimally performed, when the refractive index of the optical element and the emission wavelength of the first light source are changed by temperature of the optical system during use.

According to the above-mentioned optical pick-up apparatus, when recording and/or reproduction is performed on the first optical information recording medium featuring a thicker protective substrate, spherical aberration, caused by change of the refractive index of the optical elements and by change of the emission wavelength of the first light source due to temperature change of the optical system during use, can be corrected by a diffractive structure formed in the second region of the objective lens, and thereby, the spherical aberration can be in a range where recording and/or reproduction can be performed, and accordingly it is possible to correct spherical aberration caused by temperature change in the whole optical system.

In the above-mentioned optical pick-up apparatus, it is preferable that the spherical aberration variation amount on the converged light spot of the information recording surface due to temperature change ΔT of the optical system satisfies following formula (1).

$$-0.003[\lambda \text{ rms}/°\text{ C.}] < \Delta SA_3[\lambda \text{ rms}]/\Delta T[°\text{ C.}] < +0.003 [\lambda \text{rms}/°\text{ C.}] \quad \text{Formula (1)}$$

where, $\Delta SA_3$: the amount of change of 3rd order spherical aberration components.

When the absolute value of the spherical aberration variation amount due to temperature change ΔT in formula (1) satisfies formula (1), the jittering value does not become excessive.

Further, it is preferable that the spherical aberration variation amount on the converged light spot of the information recording surface due to temperature change ΔT of the optical system satisfies formula (2) shown below.

$$-0.003[\lambda \text{ rms}/°\text{ C.}] < \Delta SA_5[\lambda \text{ rms}]/\Delta T[°\text{ C.}] < +0.003[\lambda \text{ rms}/°\text{ C.}] \quad \text{Formula (2)}$$

where, $\Delta SA_5$: the amount of change of 5th order spherical aberration components.

When the absolute value of spherical aberration variation amount $\Delta SA_5$ due to temperature change ΔT becomes excessive, a high dimensional side-rove on the converged light spot of the information recording surface becomes excessive, and thereby signal rays from the information recording surface are included in roving rays from an adjoining track so that the jittering value becomes excessive. When the jittering value satisfies the condition of formula (2), the jittering value remains manageable.

Figure 1:
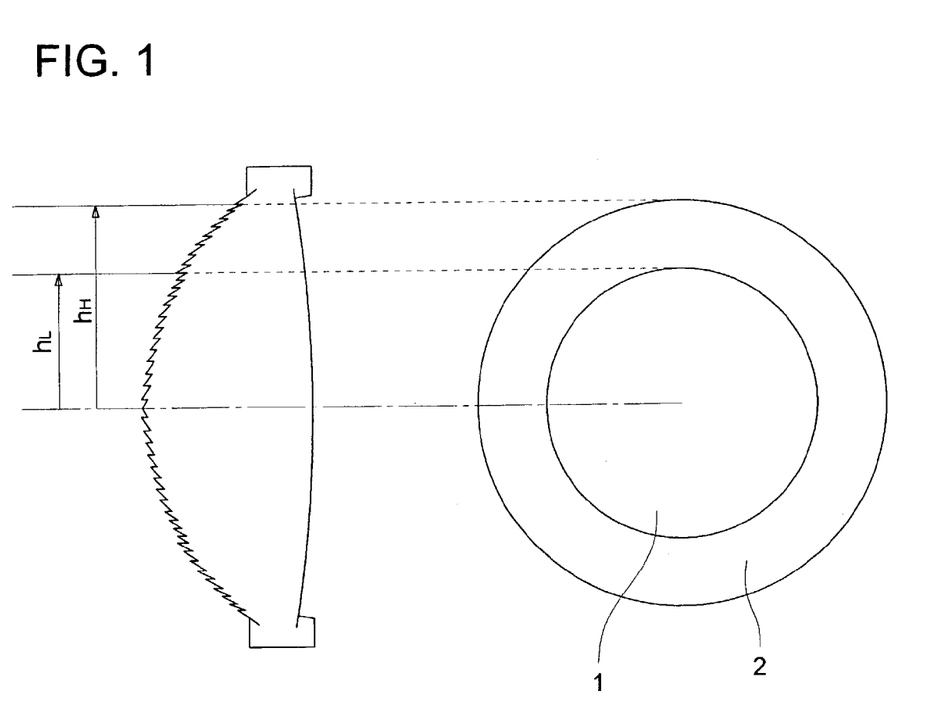
FIG. 1 is a cross sectional view of the objective lens of the present invention.

Further, when an added amount of an optical path length formed by the diffractive structure of the second region is shown below by optical path difference function φ(h) defined in Expression (1), with height h (mm) from the optical axis, 2i-ordered (even number ordered) optical path difference function coefficient $b_{2i}$, and wavelength λ (mm) of the light flux, it is preferable to satisfy the condition shown in Expression (2), and further, it is more preferable to satisfy the condition shown in Expression (3), with height $h_L$ (mm) of light rays passing through the surface of the diffractive structure of the second region 2 that is adjacent to the first region 1, and height $h_H$ (mm) of the outermost light rays of the effective light beam passing through the surface on which the diffractive structure exists, as shown in FIG. 1.

Expression (1):

$$\phi(h) = \sum_{i=1}^{\infty} b_{2i} h^{2i} \lambda$$

Expression (2):

$$\frac{\left\{\frac{\phi'(h_H) - \phi'(h_L)}{h_H - h_L}\right\}}{\lambda} < -40$$

Expression (3):

$$-190 < \frac{\left\{\frac{\phi'(h_H) - \phi'(h_L)}{h_H - h_L}\right\}}{\lambda} < -70$$

By satisfying the conditions of the Expression (2), deterioration of the spherical aberration caused by temperature change can be satisfactorily corrected by wavelength dependence of the diffractive structure.

Incidentally, in the present invention, the diffractive structure is provided at least on the second region. However, the diffractive structure can be provided on the first region as shown in FIG. 1. Further, in the embodiment shown in FIG. 1, the diffractive structure is provided on a light source side of the objective lens. However, the diffractive structure can be provided on a optical information medium side of the objective lens.

Still further, when the square root of the sum of the squares of the 3rd order spherical aberration components and the 5th order spherical aberration components of the spherical aberration variation amounts on the converged light spot of the information recording surface due to temperature change ΔT [° C.] of the optical system, is set to be $\Delta SA_{3,5}$ [λ rms], and the higher ordered spherical aberration components, higher than 5th order, of the spherical aberration variation amounts due to the temperature change ΔT, is set to be $\Delta SA_h$ [λ rms], it is preferable that the following formula (3) is satisfied, and it is more preferable that following formula (4) is satisfied.

$$|\Delta SA_{3,5}/\Delta SA_h| < 3 \quad \text{Formula (3)}$$

$$|\Delta SA_{3,5}/\Delta SA_h| < 1.1 \quad \text{Formula (4)}$$

where, $$\Delta SA_{3,5} = \sqrt{(\Delta SA_3)^2 + (\Delta SA_5)^2}$$

$\Delta SA_3$: the variation amount (λ rms/° C.) of the 3rd order spherical aberration components due to temperature change ΔT, and $\Delta SA_5$: the variation amount (λ rms/° C.) of the 5th order spherical aberration components due to temperature change ΔT.

By satisfying formula (3), the higher ordered spherical aberration components influence the jittering value so little that the jittering value caused by temperature change becomes hardly noticeable, satisfying formula (4) becomes still more effective.

When the spherical aberration variation amounts on the converged light spot of the information recording surface due to the temperature change ΔT[° C.] are set to be ΔWFE[λ rms], it is preferable that following formula (5) is satisfied, but it is more preferable that following formula (6) is satisfied.

$$|\Delta SA_{3,5}/\Delta WFE| < 0.9 \quad \text{Formula (5)}$$

$$|\Delta SA_{3,5}/\Delta WFE| < 0.75 \quad \text{Formula (6)}$$

where, $$\Delta SA_{3,5} = \sqrt{(\Delta SA_3)^2 + (\Delta SA_5)^2}$$

$$\Delta WFE = \sqrt{(\Delta SA_3)^2 + (\Delta SA_5)^2 + (\Delta SA_h)^2}$$

$\Delta SA_3$: the variation amount (λ rms/° C.) of change of 3rd order spherical aberration components due to temperature change ΔT, and $\Delta SA_5$: the variation amount (λ rms/° C.) of change of 5th order spherical aberration components to temperature change ΔT.

By satisfying formula (5), the higher ordered spherical aberration components influence the jittering value so little that the jittering value caused by temperature change is insignificant, and it is more effective to satisfy formula (6).

Further, an objective lens of the present invention is the objective lens for the optical pick-up apparatus which can perform recording and/or reproduction for the plurality of optical information recording media incorporating protective substrates of different thickness, in such a way that for a first optical information recording medium whose thickness of the protective substrate is t1, the reproduction and/or recording of information is performed by a first light source having a wavelength of λ1, and for a second optical information recording medium whose thickness of the protective substrate is t2 (t1<t2), the reproduction and/or recording of information is performed by a second light source having a wavelength of λ2 (λ1<λ2), wherein the optical pick-up apparatus has an optical system in which the light rays from the first or second light source are brought to a focus on an information recording surface through optical elements including the objective lens, the optical functional surface of the objective lens is divided into at least two concentric optical functional regions centered on an optical axis, so that the light rays, passing through the first region including the optical axis, are used for recording and/or reproduction of information on both the first optical information recording medium and the second optical information recording medium, while the light flux, passing through the second region positioning around the first region, are used mainly for recording and/or reproduction of information on the first optical information recording medium, and a diffractive structure is formed in the second region, to correct the spherical aberration on the focal point of the information recording surface to be in a range where reproduction and/or recording of the first optical information recording medium can be optimally performed, when the refractive index of the optical element and the emission wavelength of the first light source are changed by temperature of the optical system during use.

According to the above-mentioned objective lens, when recording and/or reproduction is performed on the first optical information recording medium featuring a thicker protective substrate, spherical aberration, caused by change of the refractive index of the optical elements and by change of the emission wavelength of the first light source due to temperature change of the optical system during use, can be corrected by a diffractive structure formed in the second region of the objective lens, and thereby, the spherical aberration can be in a range where recording and/or reproduction can be performed, and accordingly it is possible to correct spherical aberration caused by temperature change in the whole optical system of the optical pick-up apparatus.

In the above-mentioned objective lens, it is preferable that the spherical aberration variation amount of the converged light spot on the information recording surface due to temperature change $\Delta T$ of the objective lens and the emission wavelength of the first light source satisfies following formula (7).

$$0.000[\lambda \text{ rms}/°C.] < \Delta SA_3[\lambda \text{ rms}]/\Delta T[°C.] < +0.004[\lambda \text{ rms}/°C.] \quad \text{Formula (7)}$$

where, $\Delta SA_3$: the amount of change of 3rd order spherical aberration components.

Further, it is preferable that the spherical aberration variation amount of the converged light spot on the information recording surface due to temperature change $\Delta T$ of the objective lens and the emission wavelength of the first light source satisfies formula (8) shown below.

$$-0.003[\lambda \text{ rms}/°C.] < \Delta SA_5[\lambda \text{ rms}]/\Delta T[°C.] < +0.003[\lambda \text{ rms}/°C.] \quad \text{Formula (8)}$$

where, $\Delta SA_5$: the amount of change of 5th order spherical aberration components.

Further, when an added amount of an optical path length formed by the diffractive structure of the second region is shown below by optical path difference function $\phi(h)$ defined in Expression (1), with height h (mm) from the optical axis, 2i-ordered (even number ordered) optical path difference co-efficient $b_{2i}$, and wavelength λ (mm) of the light flux, it is preferable to satisfy the condition shown in Expression (2) mentioned above, and further, it is more preferable to satisfy the condition shown in Expression (3) mentioned above, with height $h_L$ (mm) of light rays passing through the surface of the diffractive structure of the second region that is adjacent to the first region, and height $h_H$ (mm) of the outermost light rays of the effective light beam passing through the surface on which the diffractive structure exists.

Still further, when the square root of the sum of the squares of the 3rd order spherical aberration components and the 5th order spherical aberration components of the spherical aberration variation amounts of the converged light spot on the information recording surface due to temperature change $\Delta T$ [° C.] of the objective lens and the emission wavelength of the first light source is set to be $\Delta SA_{3,5}$ [λrms], and the higher ordered spherical aberration components, higher than 5th order, of the spherical aberration variation amounts due to the temperature change $\Delta T$, is set to be $\Delta SA_h$ [λ rms], it is preferable that the following formula (9) is satisfied.

$$|\Delta SA_{3,5}/\Delta SA_h| < 3 \quad \text{Formula (9)}$$

where, $$\Delta SA_{3,5} = \sqrt{(\Delta SA_3)^2 + (\Delta SA_5)^2}$$

$\Delta SA_3$: the variation amount (λ rms/° C.) of the 3rd order spherical aberration components due to temperature change $\Delta T$, and $\Delta SA_5$: the variation amount (λ rms/° C.) of the 5th order spherical aberration components due to temperature change $\Delta T$.

Still further, when the spherical aberration variation amount of the converged light spot on the information recording surface due to the temperature change $\Delta T$[° C.] of the objective lens and the emission wavelength of the first light source is set to be $\Delta WFE$[λ rms], it is preferable that following formula (10) is satisfied.

$$|\Delta SA_{3,5}/\Delta WFE| < 0.9 \quad \text{Formula (10)}$$

where, $$\Delta SA_{3,5} = \sqrt{(\Delta SA_3)^2 + (\Delta SA_5)^2}$$

$$\Delta WFE = \sqrt{(\Delta SA_3)^2 + (\Delta SA_5)^2 + (\Delta SA_h)^2}$$

$\Delta SA_3$: the variation amount (λ rms/° C.) of change of 3rd order spherical aberration components due to temperature change $\Delta T$, and $\Delta SA_5$: the variation amount (λ rms/° C.) of change of 5th order spherical aberration components to temperature change $\Delta T$.

DETAILED DESCRIPTION OF THE PREFERRED EMBODIMENT

Figure 2:
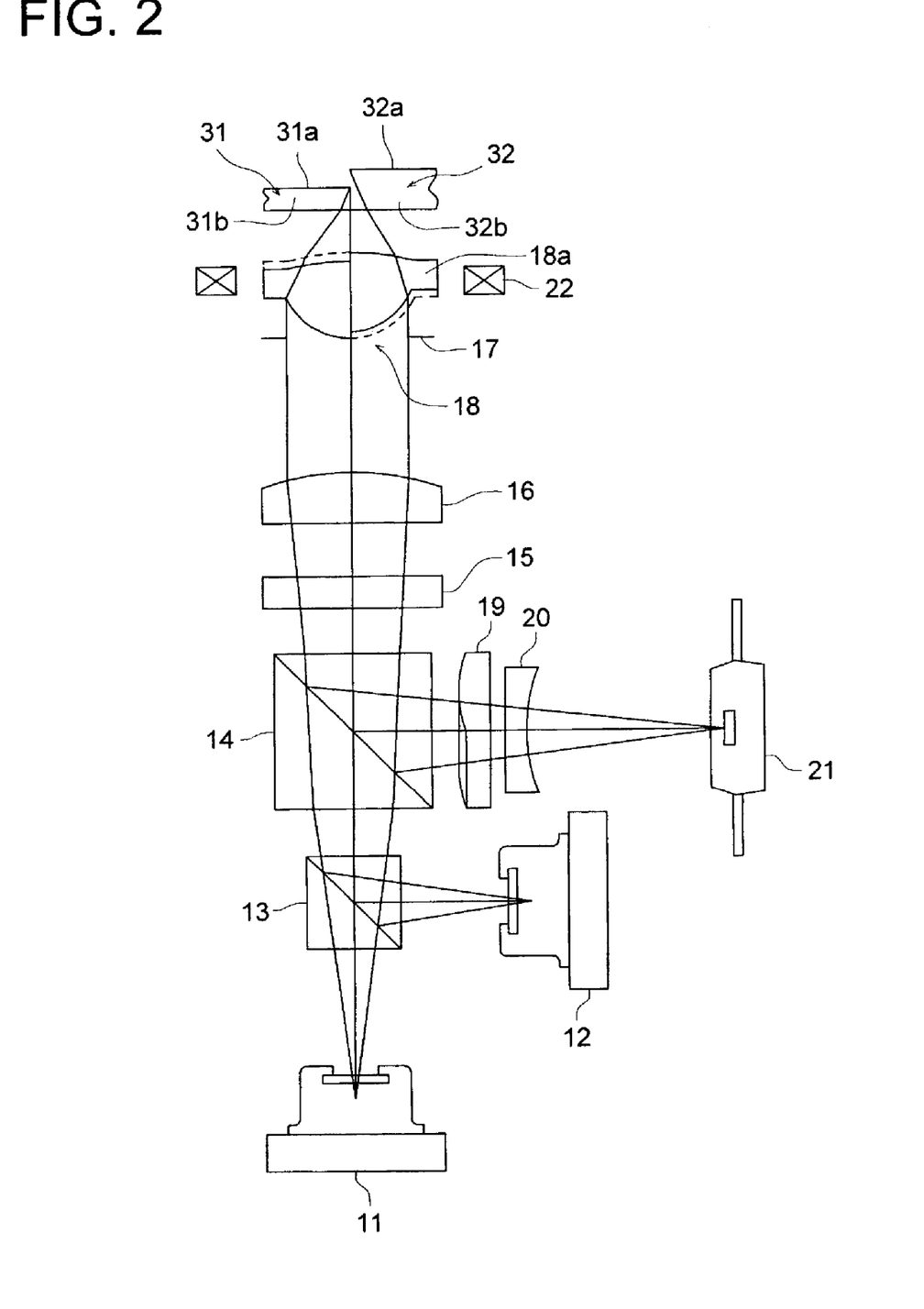
FIG. 2 is a schematic diagram showing a structure of the optical pick-up apparatus of the present embodiment.

The embodiment of the invention will be described below, referring to the drawings. FIG. 2 shows the schematic structure of the optical pick-up apparatus of the embodiment of the present invention.

The optical pick-up apparatus shown in FIG. 2 is structured in such a way that:

concerning both CD (second optical disk 32) having 1.2 mm protective substrate 32b, and DVD (first optical disk 31) having 0.6 mm protective substrate 31b, recording and/or reproduction of information can be performed on information recording surfaces 31a and 32a of first optical disk 31 and second optical disk 32, by the light fluxes of wavelengths of 655 nm and 785 nm from the first and the second light sources, respectively.

As shown in FIG. 2, the optical pick-up apparatus is provided with the optical system, including:

coupling lens 16 which refracts both light rays coming from first semiconductor (a first light source) laser 11 which emits light flux at a wavelength of 655 nm for DVD use, and light rays coming from second semiconductor (a second light source) laser 12 which emits light flux at a wavelength of 785 nm for CD use, to make nearly parallel fluxes of infinite-point rays, and objective lens 18 which brings the infinite-point rays from coupling lens 16 to a focal point on information recording surfaces 31a and 32a of optical disks 31 and 32, respectively.

Further, between each of light sources 11 and 12 and coupling lens 16, arranged are:

beam splitter 13, through which the light flux coming from first light source 11 passes, and by which the light flux coming from second light source 12 is reflected, beam splitter 14, through which each of the light fluxes coming from both of light sources 11 and 12 passes, and quarter wavelength plate 15.

Further, the light flux is reflected by information recording surfaces 31a and 32a of each of optical disks 31 and 32, then the optical paths of the light flux are changed by beam splitter 14, and the light flux travels to optical detector 21.

Objective lens 18 has flange section 18a on its outermost side, by which it is possible to attach objective lens 18 on the optical pick-up apparatus.

Flange section 18a has a surface projecting perpendicularly to the optical axis of objective lens 18 so that it is possible to be mounted precisely. Objective lens 18 is driven toward the focusing direction and the tracking direction by double shaft actuator 22.

Still further, the ring-shaped diffractive structure for the correction of the spherical aberration is formed to correct the spherical aberration caused by the difference of the thickness between protective substrates 31a and 32b of each of optical disks 31 and 32, at the central area on the optical surface of objective lens 18, which is used for recording and/or reproduction of information on both first optical disk 31 and second optical disk 32.

The ring-shaped diffractive structure is one which compensates for spherical aberration of the focal point on information recording surface 31a to be in a range where effective recording and/or reproduction of first optical disk 31 can be performed, when the refractive indexes of coupling lens 16 and objective lens 18 and the emission wavelength of first light source 11 are changed due to change of temperature of the optical pick-up apparatus during use.

The above-mentioned ring-shaped diffractive structure is formed on the peripheral area of objective lens 18 which is used mainly for reproduction or recording of information for first optical disk 31.

The central area of objective lens 18 includes the optical axis of the lens, and is a common area for DVD and CD use, whereas the peripheral area is positioned around the central area, and is used exclusively for DVD.

In case of information reproduction from first optical disk (DVD) 31, a light beam is emitted from first semiconductor laser 11, which passes through beam splitters 13 and 14, quarter wavelength plate 15, and coupling lens 16 to become a parallel light beam.

The parallel light beam passes through diaphragm 17, and is converged on information recording surface 31a by objective lens 18, through protective substrate 31b of first optical disk 31.

Then, the light beam is modulated by information pits on information recording surface 31a and is reflected, passes back through objective lens 18, diaphragm 17, coupling lens 16, and quarter wavelength plate 15, next, the light beam is reflected by beam splitter 14, and is given astigmatism by cylindrical lens 19, after that, the light beam passes through concave lens 20, and enters optical detector 21.

Then, information recorded on first optical disk 31 is read-out, and information read-out signals are produced.

Still further, focal detection and track detection are performed by detecting a change in the amount of light caused by the change of position and the change of shape of specific spot on optical detector 21, yet further, based on the above-mentioned detection, double shaft actuator 22 moves objective lens 18 in the focusing direction so that the light beam from first semiconductor laser 11 is brought into focus on information recording surface 31a of first optical disk 31, and double shaft actuator 22 also moves objective lens 18 in the tracking direction so that the light beam from first semiconductor laser 11 is brought into focus on a predetermined track. The information recording on first optical disk 31 is performed in the same way as mentioned above.

Next, in case of information reproduction from second optical disk (CD) 32, a light beam is emitted from first semiconductor laser 12, which is reflected by beam splitter 13, and passes through beam splitter 14, quarter wavelength plate 15, and coupling lens 16, to become a parallel light beam.

The parallel light beam passes through diaphragm 17, and is converged on information recording surface 32a by objective lens 18, through protective substrate 32b of second optical disk 32.

The light beam is modulated by information pits on information recording surface 32a and is reflected, passes back through objective lens 18, diaphragm 17, coupling lens 16, and quarter wavelength plate 15, next, the light beam is reflected by beam splitter 14, and is given astigmatism by cylindrical lens 19, after that, passes through concave lens 20, and enters optical detector 21.

Further, information recorded on second optical disk 32 is read-out, and information read-out signals are produced. Focal detection and track detection are performed by detecting a change in the amount of light caused by the change of position and the change of shape of the specific spot on optical detector 21, then, based on the above-mentioned detection, double shaft actuator 22 moves objective lens 18 in the focusing direction so that the light beam from second semiconductor laser 12 is brought into focus on information recording surface 32a of second optical disk 32, and double shaft actuator 22 also moves objective lens 18 in the tracking direction so that the light beam from first semiconductor laser 12 is brought into focus on a predetermined track. The information recording on second optical disk 32 is performed in the same way as mentioned above.

In case of the above-mentioned reproduction and/or recording on first optical disk 31, when the refractive indexes of coupling lens 16 and objective lens 18 and the emission wavelength of first optical light source 11 change, due to temperature change of the optical pick-up apparatus, the focal point on information recording surface 31a changes so that any spherical aberration occurs largely during use of DVDs than CDs. Any spherical aberration is corrected by the diffractive structure arranged on the peripheral area of objective lens 18 so that spherical aberration remains in a range in which reproduction and/or recording on first optical disk 31 can be optimally performed. Due to this, when relatively short wavelength laser rays and an objective lens with a high numerical aperture are used, as in the case of DVD usage, it is possible to reduce adverse influence of spherical aberrations, caused by temperature change, during the recording and/or reproduction, and thereby, an optical pick-up apparatus exhibiting high reliability can be realized.

EXAMPLE

Next, the present invention will be described in detail below, showing Examples 1 and 2 of the optical systems in which the objective lens and the coupling lens are paired, however, the present invention is not limited to these examples. In the present example, the first optical information recording medium is a DVD (design base wavelength: 655 nm), and the second optical information recording medium is a CD (design base wavelength: 785 nm). The optical systems shown in Examples 1 and 2 can be applied to the optical pick-up apparatus shown in FIG. 2.

When the optical surfaces of the objective lens and the coupling lens in the present example are structured to be aspheric surfaces, each aspheric surface has the aspheric shape shown in Expression 4, in which "Z" is parallel to the optical axis, "h" is perpendicular to the optical axis, "r" is a paraxial radius of curvature, "K" is a cone coefficient, and "A" is an aspheric coefficient.

$$Z = \frac{h^2/r}{1 + \sqrt{1-(1+\kappa)(h/r)^2}} + \sum_{i=0}^{\infty} A_{2i} h^{2i} \qquad \text{Expression (4)}$$

The diffractive structure formed on the objective lens is shown by the following Expression 5, using $\Phi_B$ as the optical path difference function, and radian units.

$$\Phi_B = \sum_{i=0}^{\infty} B_{2i} h^{2i} \qquad \text{Expression (5)}$$

Example 1

Figure 3A:
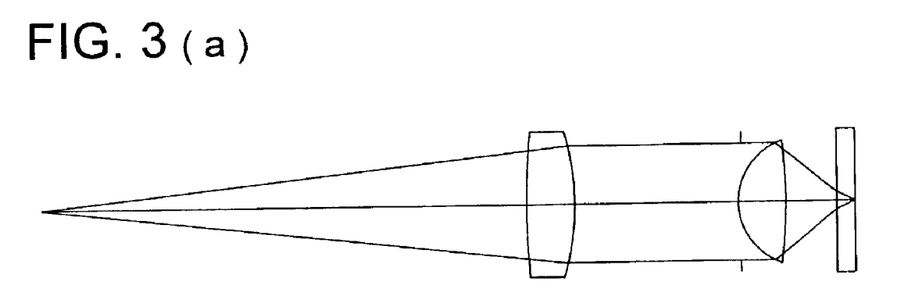
FIG. 3(a) is a drawing of a light path, when DVD is used in Examples 1 and 2.
Figure 3B:
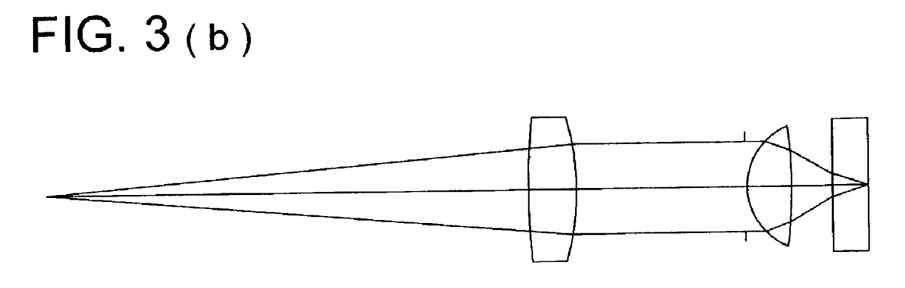
FIG. 3(b) is a drawing of a light path, when CD is used.

Example 1 features an optical system in which the light rays, parallel to the optical axis, enter the objective lens from the coupling lens, in both cases of DVD and CD. FIG. 3(*a*) shows the optical path for DVD usage, and FIG. 3(*b*) shows the optical path for CD usage. Table 1 shows lens data of Example 1.

TABLE 1

| | $f_1$ = 2.33 mm NA1: 0.65 | | | $f_2$ = 2.35 mm NA2: 0.51 | |
|---|---|---|---|---|---|
| i-th surface | ri | di (660 nm) | ni (660 nm) | di (788 nm) | ni (788 nm) |
| 0 | | 11.2473 | | 11.2473 | |
| 1 | 76.33199 | 1.26000 | 1.54076 | 1.26000 | 1.53709 |
| 2 | −7.05094 | 5.00000 | 1.0 | 5.37084 | 1.0 |
| 3 | 1.42047 | 1.29000 | 1.53956 | 1.29000 | 1.53589 |
| 3' | 1.51385 | 1.29002 | 1.53956 | 1.29002 | 1.53589 |
| 4 | −7.45516 | 1.20912 | 1.0 | 0.83828 | 1.0 |
| 5 | ∞ | 0.6 | 1.57718 | 1.2 | 1.57051 |
| 6 | ∞ | | | | | aspheric surface data the 2nd surface
aspheric coefficients

κ −1.0000 × E−1
A1 +2.1479 × E−4    P1  4.0
A2 +3.4212 × E−6    P2  6.0 the 3rd surface(0 < h < 1.200 mm: DVD/CD common area)
aspheric coefficients

κ −2.7863 × E−0
A1 +7.8158 × E−2    P1  4.0
A2 −1.7319 × E−2    P2  6.0
A3 +6.6991 × E−3    P3  8.0
A4 −7.7846 × E−3    P4  10.0
A5 +4.7234 × E−3    P5  12.0
A6 −8.1378 × E−4    P6  14.0 optical path difference function
(coefficient of optical path difference function:
design base wavelength 690 nm)

C4 −1.4668 × E+1
C6 +1.2614 × E+1
C8 −1.1416 × E+1
C10 +3.2829 × E−0 the 3'rd surface (1.200 mm < h: exclusive DVD area)
aspheric coefficients

κ −4.2018 × E−0
A1 +1.2229 × E−1    P1  4.0
A2 −2.5710 × E−2    P2  6.0
A3 +2.4481 × E−3    P3  8.0
A4 −3.1138 × E−3    P4  10.0
A5 +2.3763 × E−3    P5  12.0
A6 −4.6444 × E−4    P6  14.0 optical path difference function
(coefficient of optical path difference function:
design base wavelength 660 nm)

C2 −1.9444 × E+1
C4 +1.1987 × E+1
C6 −2.2400 × E−0
C8 −3.3620 × E−0
C10 +9.3305 × E−1 the 4th surface
aspheric coefficients

κ +1.0149 × E+1
A1 +1.9952 × E−2    P1  4.0
A2 +1.3978 × E−3    P2  6.0
A3 +4.8040 × E−3    P3  8.0
A4 −6.1139 × E−3    P4  10.0
A5 +2.2855 × E−3    P5  12.0
A6 −3.0928 × E−4    P6  14.0

Example 2

Example 2 is the optical system in which the light rays parallel to the optical axis enter the objective lens from the coupling lens, in the case both for DVD and CD. The optical path for DVD usage is the same as that shown in FIG. 3(a), and the optical path for CD usage is the same as that shown in FIG. 3(b). Table 2 shows lens data of Example 2.

TABLE 2

| $f_1$ = 2.50 mm | | | $f_2$ = 2.52 mm | |
| NA1: 0.60 | | | NA2: 0.47 | |
| i-th surface | ri | di (655 nm) | ni (655 nm) | di (785 nm) | ni (785 nm) |
| --- | --- | --- | --- | --- | --- |
| 0 | | 14.9412 | | 14.9412 | |
| 1 | 96.95215 | 1.78000 | 1.54094 | 1.78000 | 1.53716 |
| 2 | −9.44222 | 5.00000 | 1.0 | 5.36597 | 1.0 |
| 3 | 1.56572 | 1.21000 | 1.54094 | 1.21000 | 1.53716 |
| 3' | 1.63695 | 1.21000 | 1.54094 | 1.21000 | 1.53716 |
| 4 | −7.23168 | 1.44192 | 1.0 | 1.07595 | 1.0 |
| 5 | ∞ | 0.6 | 1.57752 | 1.2 | 1.57063 |
| 6 | ∞ | | | | | aspheric surface data the 2nd surface
aspheric coefficients

κ −1.0000 × E−1
A1 +9.0687 × E−5    P1  4.0
A2 +7.6544 × E−7    P2  6.0 the 3rd surface(0 < h < 1.180 mm: DVD/CD common area)
aspheric coefficients

κ −1.4132 × E−0
A1 +2.0442 × E−2    P1  4.0
A2 +6.4295 × E−3    P2  6.0
A3 −4.6904 × E−3    P3  8.0
A4 +3.4762 × E−3    P4  10.0
A5 −1.8483 × E−3    P5  12.0
A6 +3.4186 × E−4    P6  14.0 optical path difference function
(coefficient of optical path difference function:
design base wavelength 720 nm)

C4 −6.6989 × E−0
C6 +1.2273 × E−0
C8 −1.1807 × E−0
C10 +2.1733 × E−1 the 3'rd surface (1.180 mm < h: exclusive DVD area)
aspheric coefficients

κ −1.3055 × E−0
A1 +4.7718 × E−2    P1  4.0
A2 −2.2815 × E−2    P2  6.0
A3 +1.3503 × E−2    P3  8.0
A4 −4.0679 × E−3    P4  10.0
A5 +3.9292 × E−4    P5  12.0 optical path difference function
(coefficient of optical path difference function:
design base wavelength 655 nm)

C2 −6.9324 × E−0
C4 +5.9831 × E−0
C6 −5.5991 × E−0
C8 +7.1254 × E−1
C10 +9.8328 × E−2 the 4th surface
aspheric coefficients

κ −6.6037 × E−0
A1 +2.0092 × E−2    P1  4.0
A2 +1.3618 × E−2    P2  6.0
A3 −1.9554 × E−2    P3  8.0
A4 +8.5016 × E−3    P4  10.0
A5 −1.7678 × B−3    P5  12.0
A6 +1.4752 × E−4    P6  14.0

In Examples 1 and 2, spherical aberration, caused by the thickness difference between the protective substrates, is corrected by the ring-shaped diffractive structure formed in the common area for DVD and CD of the objective lens, and the spherical aberration caused by the temperature change is corrected by the ring-shaped diffractive structure formed in the exclusive DVD area.

Further, temperature characteristics of the objective lens and the temperature characteristics of the whole optical system in Example 1 are shown below in Table 3.

TABLE 3

| | | | | | |
| --- | --- | --- | --- | --- | --- |
| | | | Example 1 | | |
| | $\Delta SA_3/\Delta T$ | $\Delta SA_5/\Delta T$ | $\|\Delta SA_{3,5}\|/\Delta SA_h\|$ | $\|\Delta SA_{3,5}\|/\Delta WFE\|$ | Value of Expression 6 |
| | Temperature characteristics of the objective lens ($\lambda$ = 660 nm approximately, NA 0.65) | | | | |
| Conventional example | 4.30E−04 | 5.30E−04 | 5.80 | 0.99 | −2.8 |
| Present example | 3.00E−04 | 1.66E−04 | 0.93 | 0.68 | −172.6 |
| | Temperature characteristics of the optical system ($\lambda$ = 660 nm approximately, NA 0.65) | | | | |
| Conventional example | 1.30E−04 | 5.00E−04 | 4.44 | 0.98 | −2.8 |
| Present example | 0.00E+00 | 1.66E−04 | 0.50 | 0.47 | −172.6 |

Further, temperature characteristics of the objective lens and temperature characteristics of the whole optical system in Example 2 are shown below in Table 4.

TABLE 4

| | | | | | |
| --- | --- | --- | --- | --- | --- |
| | | | Example 2 | | |
| | $\Delta SA_3/\Delta T$ | $\Delta SA_5/\Delta T$ | $\|\Delta SA_{3,5}\|/\Delta SA_h\|$ | $\|\Delta SA_{3,5}\|/\Delta WFE\|$ | Value of Expression 6 |
| | Temperature characteristics of the objective lens ($\lambda$ = 655 nm approximately, NA 0.60) | | | | |
| Conventional example | 6.67E−04 | 3.67E−04 | 6.97 | 0.99 | −31.5 |
| Present example | 2.67E−04 | 3.33E−05 | 1.53 | 0.84 | −89.3 |
| | Temperature characteristics of the optical system ($\lambda$ = 655 nm approximately, NA 0.60) | | | | |
| Conventional example | 4.66E−04 | 3.67E−04 | 5.61 | 0.98 | −31.5 |
| Present example | 6.67E−05 | 3.33E−05 | 0.46 | 0.42 | −89.3 |

As shown in Tables 3 and 4, concerning each of the objective lenses in Examples 1 and 2, among the spherical aberration variation amounts of the converged light spot on the information recording surface due to the temperature change $\Delta T$, the 3rd spherical-aberration variation amount $\Delta SA_3[\lambda \text{ rms}]/\Delta T[° C.]$ and the 5th spherical aberration variation amount $\Delta SA_5[\lambda \text{ rms}]/\Delta T[° C.]$ satisfy the conditions shown by the above-mentioned formulas (7) and (8), respectively. Further, they satisfy the condition shown by the above-mentioned formulas (9) and (10), respectively.

Further, concerning each of the optical systems in Examples 1 and 2, among the spherical aberration variation amounts of the converging spot on the information recording surface due to the temperature change ΔT, the 3rd spherical aberration variation amount $\Delta SA_3[\lambda \text{ rms}]/\Delta T[° C.]$ and the 5th spherical aberration variation amount $\Delta SA_5[\lambda \text{ rms}]/\Delta T[° C.]$ satisfy the conditions shown by the above-mentioned formulas (1) and (2), respectively. Further, they also satisfy the conditions shown by the above-mentioned formulas (4) and (6), respectively.

Setting the height of the rays to be $h_L$ (mm), when the rays pass through the surface of the diffractive structure of the exclusive DVD area which is adjacent to the common area on the objective lens, setting the height of the rays of the outermost section of the effective light beam to be $h_H$ (mm), when the rays pass through the surface on which the diffractive structure exists for the exclusive use of DVD, and setting the wavelength to be λ (mm), the values (unit: 1/mm²) of the expression, shown in following Expression 6 using the above-mentioned optical pass difference function Φ(h) shown in Expression 1, satisfy the conditions of the above-mentioned Expressions 2 and 3 for the objective lens and the optical system, respectively. The satisfaction of the condition shown in Expression 2 satisfactorily correct the deterioration of the spherical aberration due to temperature change, by the wavelength dependence of the diffractive structure.

$$\frac{\left\{\frac{\phi'(h_H) - \phi'(h_L)}{h_H - h_L}\right\}}{\lambda} \quad (1/\text{mm}^2)$$

Expression (6)

In Tables 1 and 2, $f_1$ is the focal length (mm) of the objective lens on the information recording surface for a DVD, $f_2$ is the focal length (mm) of the objective lens on the information recording surface for a CD, $NA_1$ is the numerical aperture of the image side of the objective lens for the DVD usage, and $NA_2$ is the numerical aperture of the image side of the objective lens for the CD usage.

Further, in the above-mentioned Tables or FIGS, "E" (or "e") shows powers of 10, that is, E-02 or E-2 means $10^{-2}$.

According to the present invention, in the optical pick-up apparatus which performs at least either recording or reproduction for a plurality of information recording media which are of various types, it is possible to provide for a pick-up apparatus and an objective lens for the pick-up apparatus which can correct for the spherical aberration caused by a temperature change in the optical system, when recording or reproduction is performed by shorter wavelength light beams.

What is claimed is:

1. An optical pick-up apparatus for conducting recording and/or reproduction information for a plurality of optical information recording mediums having respective protective base boards different in thickness, comprising:
   a first light source having a wavelength of λ1 for conducting reproduction and/or recording information for a first optical information recording medium including a protective substrate having a thickness t1;
   a second light source having a wavelength of λ2 (λ1<λ2) for conducting reproduction and/or recording information for a second optical information recording medium including a protective substrate having a thickness t2 (t1<t2);
   an optical system to focus a light flux from the first and second light sources on an information recording surface through an optical element including an objective lens,
   wherein an optical functional surface of the objective lens is divided into at least two concentric optical functional regions having a center on an optical axis so that a light flux having passed through a first region including the optical axis is used for recording and/or reproduction information for both of the first and second optical information recording mediums, and a light flux having passed through a second region positioned around the first region is used mainly for recording and/or reproduction information for the first optical information recording medium, and
   wherein the second region is provided with a diffractive structure to correct a spherical aberration of a converged light spot on an information recording plane to be regulated in a range where reproduction and/or recording information for the first optical information recording medium can be conducted when the refractive index of the optical element and the wavelength of the first light source vary due to a change of the working temperature of the optical system,
   wherein when an additional length of an optical path length added by the diffractive structure of the second region is represented by the following optical path difference function φ(h):

$$\phi(h) = \sum_{i=1}^{\infty} b_{2i} h^{2i} \lambda$$

where h is a height (mm) from the optical axis, $b_2$ is a 2i-th order coefficient of the optical path difference function, and λ is a wavelength (mm) of a light flux,
   the following conditional formula is satisfied:

$$\frac{\left\{\frac{\phi'(h_H) - \phi'(h_L)}{h_H - h_L}\right\}}{\lambda} < -40$$

where $h_L$ is a height (mm) of a light ray from an optical axis to a plane of the diffractive structure of the second region where the light ray passes through and the second region comes in contact with the first region, and $h_H$ is a height (mm) of a light ray of an outermost portion of an effective light flux from an optical axis to a plane of the diffractive structure where the light ray passes through.

2. The optical pick-up apparatus of claim 1, wherein a variation amount of the spherical aberration of the converged light spot on the information recording plane for the change ΔT of the working temperature of the optical system satisfies the following formula:

$$-0.003 < \Delta SA_5/\Delta T < +0.003.$$

3. The optical pick-up apparatus of claim 1, wherein the following conditional formula is satisfied:

$$-190 < \frac{\left\{\frac{\phi'(h_H) - \phi'(h_L)}{h_H - h_L}\right\}}{\lambda} < -70$$

4. The optical pick-up apparatus of claim 1, wherein a variation amount of the spherical aberration of the converged light spot on the information recording plane for the change $\Delta T$ of the working temperature of the optical system satisfies the following formula:

$-0.003 < \Delta SA_3/\Delta T < +0.003$.

5. The optical pick-up apparatus of claim 4, wherein when a square root of a sum of a square of the third order spherical aberration component and a square of the fifth order spherical aberration component in a variation amount of a spherical aberration of a converged light spot on the information recording plane due to a temperature change $\Delta T$ of the optical system is $SA_{3,5}$ and a high order spherical aberration component higher than fifth order in the variation amount of the spherical aberration due to a temperature change $\Delta T$ is $\Delta SA_h$, the following formula is satisfied:

$|\Delta SA_{3,5}/\Delta SA_h| < 3$ where, $\Delta SA_{3,5} = \sqrt{(\Delta SA_3)^2 + (\Delta SA_5)^2}$ $\Delta SA_3$ is a variation amount ($\lambda$ rms/° C.) of the 3rd order spherical aberration components due to a temperature change $\Delta T$, and
$\Delta SA_5$ is a variation amount ($\lambda$ rms/° C.) of the 5th order spherical aberration components due to a temperature change $\Delta T$.

6. The optical pick-up apparatus of claim 5, wherein the following formula is satisfied:

$|\Delta SA_{3,5}/\Delta SA_h| < 1.1$.

7. The optical pick-up apparatus of claim 4, wherein a variation amount of a spherical aberration of a converged light spot on the information recording plane due to a temperature change $\Delta T$ of the optical system is $\Delta WFE$, the following condition is satisfied:

$|\Delta SA_{3,5}/\Delta WFE| < 0.9$ where $\Delta SA_{3,5} = \sqrt{(\Delta SA_3)^2 + (\Delta SA_5)^2}$ $\Delta WFE = \sqrt{(\Delta SA_3)^2 + (\Delta SA_5)^2 + (\Delta SA_h)^2}$ $\Delta SA_3$ is a variation amount ($\lambda$ rms/° C.) of the 3rd order spherical aberration components due to a temperature change $\Delta T$, and
$\Delta SA_5$ is a variation amount ($\lambda$ rms/° C.) of the 5th order spherical aberration components due to a temperature change $\Delta T$.

8. The optical pick-up apparatus of claim 7, wherein the following condition is satisfied:

$|\Delta SA_{3,5}/\Delta WFE| < 0.75$.

9. An objective lens for use in an optical pick-up apparatus for conducting recording and/or reproduction information for a plurality of optical information recording mediums having respective protective base boards different in thickness, wherein the optical pick-up apparatus is provided with a first light source having a wavelength of $\lambda 1$ for conducting reproduction and/or recording information for a first optical information recording medium including a protective substrate having a thickness t1; a second light source having a wavelength of $\lambda 2$ ($\lambda 1 < \lambda 2$) for conducting reproduction and/or recording information for a second optical information recording medium including a protective substrate having a thickness t2 (t1<t2); and an optical system to focus a light flux from the first and second light sources on an information recording surface through an optical element including an objective lens, the objective lens comprising:
an optical functional surface divided into at least two concentric optical functional regions having a center on an optical axis so that a light flux having passed through a first region including the optical axis is used for recording and/or reproduction information for both of the first and second optical information recording mediums, and a light flux having passed through a second region positioned around the first region is used mainly for recording and/or reproduction information for the first optical information recording medium, and
a diffractive structure provided on the second region and to correct a spherical aberration of a converged light spot on an information recording plane to be regulated in a range where reproduction and/or recording information for the first optical information recording medium can be conducted when the refractive index of the optical element and the wavelength of the first light source vary due to a change of the working temperature of the optical system,
wherein when an additional length of an optical path length added by the diffractive structure of the second region is represented by the following optical path difference function $\phi(h)$:

$$\phi(h) = \sum_{i=1}^{\infty} b_{2i} h^{2i} \lambda$$

where h is a height (mm) from the optical axis, $b_{2i}$ is a $2i$-th order coefficient of the optical path difference function, and $\lambda$ is a wavelength (mm) of a light flux,
the following conditional formula is satisfied:

$$\frac{\left\{\frac{\phi'(h_H) - \phi'(h_L)}{h_H - h_L}\right\}}{\lambda} < -40$$

where $h_L$ is a height (mm) of a light ray from an optical axis to a plane of the diffractive structure of the second region where the light ray passes through and the second region comes in contact with the first region, and $h_H$ is a height (mm) of a light ray of an outermost portion of an effective light flux from an optical axis to a plane of the diffractive structure where the light ray passes through.

10. The optical pick-up apparatus of claim 1, wherein the optical element further includes a coupling lens on an optical path of a light flux emitted by the first light source and a light flux emitted by the second light source.

11. The optical pick-up apparatus of claim 1, wherein a parallel light flux emitted by the coupling lens enters into the objective lens.

* * * * *